United States Patent
Kim et al.

(10) Patent No.: US 9,906,045 B2
(45) Date of Patent: Feb. 27, 2018

(54) METHOD AND APPARATUS FOR SYNCHRONIZATION CONTROL IN WIRELESS POWER TRANSMISSION SYSTEM

(71) Applicant: Samsung Electronics Co., Ltd., Suwon-si (KR)

(72) Inventors: Nam Yun Kim, Seoul (KR); Sang Wook Kwon, Seongnam-si (KR); Hyuk Choon Kwon, Seoul (KR); Ki Young Kim, Yongin-si (KR); Bong Chul Kim, Seoul (KR); Yun Kwon Park, Dongducheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 671 days.

(21) Appl. No.: 14/331,996

(22) Filed: Jul. 15, 2014

(65) Prior Publication Data

US 2015/0022015 A1 Jan. 22, 2015

(30) Foreign Application Priority Data

Jul. 17, 2013 (KR) .................. 10-2013-0084218

(51) Int. Cl.
*H02J 5/00* (2016.01)
*H04B 5/00* (2006.01)

(52) U.S. Cl.
CPC ............ *H02J 5/005* (2013.01); *H04B 5/0037* (2013.01); *H04B 5/0081* (2013.01); *H04B 5/0031* (2013.01)

(58) Field of Classification Search
None
See application file for complete search history.

(56) References Cited

U.S. PATENT DOCUMENTS

| | | | |
|---|---|---|---|
| 2002/0022495 | A1 | 2/2002 | Choi et al. |
| 2010/0181961 | A1 | 7/2010 | Novak et al. |
| 2011/0149788 | A1 | 6/2011 | Chuang et al. |
| 2011/0149818 | A1 | 6/2011 | Choi et al. |
| 2011/0154087 | A1 | 6/2011 | Craine |
| 2012/0202435 | A1 | 8/2012 | Kim et al. |
| 2012/0206096 | A1 | 8/2012 | John |
| 2012/0314745 | A1 | 12/2012 | Tsai et al. |
| 2013/0058379 | A1 | 3/2013 | Kim et al. |

(Continued)

FOREIGN PATENT DOCUMENTS

| | | |
|---|---|---|
| KR | 10-2011-0094382 A | 8/2011 |
| WO | WO 2012/014787 A1 | 2/2012 |

OTHER PUBLICATIONS

International Search Report dated Jun. 9, 2014, in counterpart International Application No. PCT/KR2014/001835 (3 pages, in English).

(Continued)

*Primary Examiner* — Jared Fureman
*Assistant Examiner* — Aqeel Bukhari
(74) *Attorney, Agent, or Firm* — NSIP Law

(57) ABSTRACT

A method of synchronization control of a power transmitting unit (PTU) includes network-connecting a PTU to a PTU operating in a slave mode by setting an operation mode of the PTU to a master mode, and transmitting a signal to a power receiving unit (PRU) by controlling either one or both of a communication time and a communication frequency of the PTU operating in the slave mode.

21 Claims, 18 Drawing Sheets

(56) References Cited

U.S. PATENT DOCUMENTS

2013/0058380 A1 3/2013 Kim et al.
2015/0303710 A1* 10/2015 John .................... A61N 1/3785
307/104

OTHER PUBLICATIONS

Partial Supplementary European Search Report dated Feb. 9, 2017, in counterpart European Application No. 14827026.7 (7 pages, in English).

Extended European Search Report dated Jun. 13, 2017, in corresponding European Patent Application No. 14827026.7 (13 pages, in English).

* cited by examiner

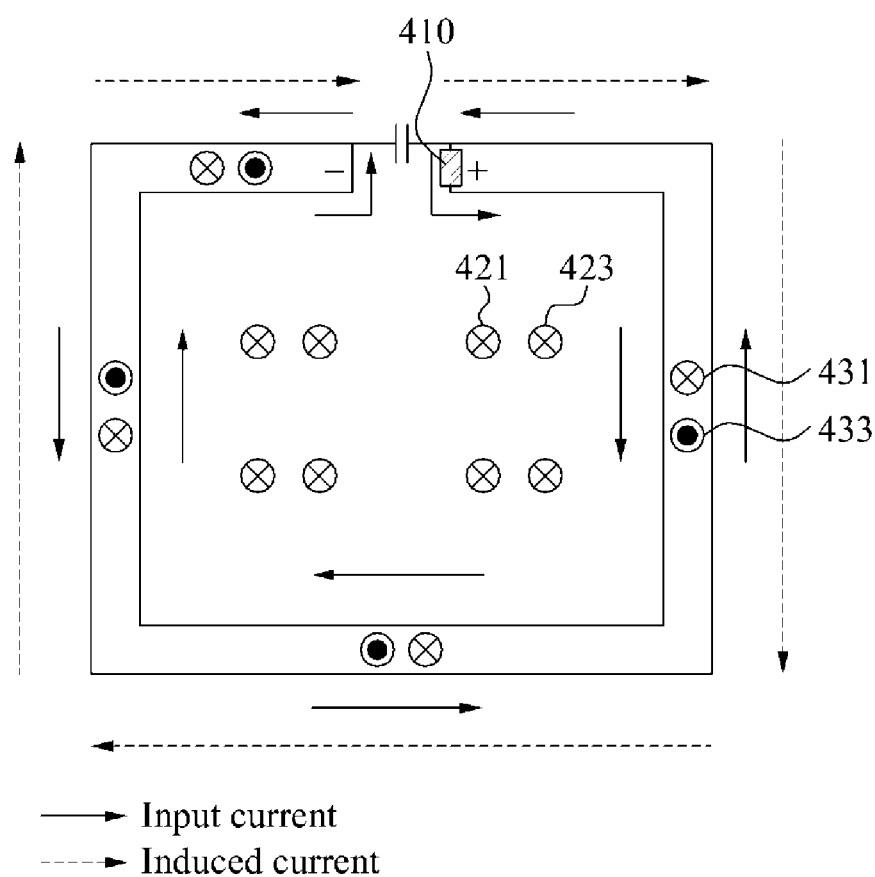

FIG. 8

| Frequency | LL | |
|---|---|---|
| 2402 MHz | 37 | |
| 2404 MHz | 0 | |
| 2406 MHz | 1 | ~811 |
| 2408 MHz | 2 | |
| 2410 MHz | 3 | |
| 2412 MHz | 4 | |
| 2414 MHz | 5 | |
| 2416 MHz | 6 | ~812 |
| 2418 MHz | 7 | |
| 2420 MHz | 8 | |
| 2422 MHz | 9 | ~814 |
| 2424 MHz | 10 | |
| 2426 MHz | 38 | |
| 2428 MHz | 11 | |
| 2430 MHz | 12 | ~815 |
| 2432 MHz | 13 | |
| 2434 MHz | 14 | |
| 2436 MHz | 15 | |
| 2438 MHz | 16 | |
| 2440 MHz | 17 | |
| 2442 MHz | 18 | |
| 2444 MHz | 19 | |
| 2446 MHz | 20 | |
| 2448 MHz | 21 | |
| 2450 MHz | 22 | |
| 2452 MHz | 23 | |
| 2454 MHz | 24 | |
| 2456 MHz | 25 | |
| 2458 MHz | 26 | |
| 2460 MHz | 27 | ~813 |
| 2462 MHz | 28 | |
| 2464 MHz | 29 | |
| 2466 MHz | 30 | |
| 2468 MHz | 31 | |
| 2470 MHz | 32 | |
| 2472 MHz | 33 | |
| 2474 MHz | 34 | |
| 2476 MHz | 35 | |
| 2478 MHz | 36 | |
| 2480 MHz | 39 | |

METHOD AND APPARATUS FOR SYNCHRONIZATION CONTROL IN WIRELESS POWER TRANSMISSION SYSTEM

CROSS-REFERENCE TO RELATED APPLICATIONS

This application claims the benefit under 35 USC 119(a) of Korean Patent Application No. 10-2013-0084218 filed on Jul. 17, 2013, in the Korean Intellectual Property Office, the entire disclosure of which is incorporated herein by reference for all purposes.

BACKGROUND

1. Field

The following description relates to a method and an apparatus for synchronization control in a wireless power transmission system.

2. Description of Related Art

Wireless power transmission refers to energy transmitted to a power receiving unit (PRU) from a power transmitting unit (PTU) via magnetic resonant coupling. Accordingly, a wireless power transmission system or a wireless power charging system includes a source device for wirelessly transmitting power and a target device for wirelessly receiving power. The source device may be referred to as a source or the PTU. Also, the target device may be referred to as a target or the PRU.

The source device includes a source resonator, and the target device includes a target resonator. Magnetic resonant coupling occurs between the source resonator and the target resonator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of synchronization control of a power transmitting unit (PTU) includes network-connecting a PTU to a PTU operating in a slave mode by setting an operation mode of the PTU to a master mode; and transmitting a signal to a power receiving unit (PRU) by controlling either one or both of a communication time and a communication frequency of the PTU operating in the slave mode.

The signal may include a beacon signal.

The transmitting of the signal to the PRU may include controlling a transmission start time of a signal sequence to be transmitted to the PRU.

The transmitting of the signal to the PRU may include controlling a transmission period of a signal sequence to be transmitted to the PRU.

The transmitting of the signal to the PRU may include transmitting a control signal to the PTU operating in the slave mode to enable the PRU to receive a single signal during a single time slot.

The transmitting of the signal to the PRU may include controlling either one or both of the communication time and the communication frequency based on information on a preset signal.

The transmitting of the signal to the PRU may include controlling either one or both of the communication time and the communication frequency of the PTU operating in the slave mode based on information on the transmitted signal.

The transmitting of the signal to the PRU may include controlling the communication frequency using frequency hopping.

The transmitting of the signal to the PRU may further include setting a frequency hopping sequence of the PTU and the PTU operating in the slave mode; and transmitting the signal to the PRU by controlling the communication frequency based on the frequency hopping sequence.

The transmitting of the signal to the PRU further may include controlling a hopping start frequency of the frequency hopping sequence.

The network-connecting of the PTU to the PTU operating in the slave mode may include setting an index of the PTU operating in the slave mode.

The setting of the index of the PTU operating in the slave mode may include transmitting information on the index to the PTU operating in the slave mode.

The PTU operating in the slave mode may be one of a plurality of PTUs operating in the slave mode; and the transmitting of the information on the index to the PTU operating in the slave mode may include generating the information on the index based on a sequential order in which the plurality of PTUs operating in the slave mode were network-connected to the PTU.

In another general aspect, a non-transitory computer-readable storage medium stores a program for controlling a computer to perform the method described above.

In another general aspect, a method of synchronization control of a power transmitting unit (PTU) includes network-connecting a PTU to a neighboring PTU operating in a master mode; comparing an index of the PTU to an index of a neighboring PTU operating in a slave mode in response to removal of the neighboring PTU operating in the master mode; and setting an operation mode of the PTU to the master mode in response to a result of the comparing being that the index of the PTU is higher than the index of the neighboring PTU operating in the slave mode.

The setting of the operation mode of the PTU to the master mode may include network-connecting the PTU to the neighboring PTU operating in the slave mode by setting the operation mode of the PTU to the master mode.

In another general aspect, a method of synchronization control of a power transmitting unit (PTU) includes network-connecting a PTU to a PTU operating in a slave mode by setting an operation mode of the PTU to a master mode; and synchronizing an operation of transmitting a signal from the PTU operating in the slave node to a power receiving unit (PRU) with an operation of transmitting a signal from the PTU to the PRU.

The synchronizing may include synchronizing the operation of transmitting the signal from the PTU operating in the slave node to the PRU with the operation of transmitting the signal from the PTU to the PRU so that the signal transmitted from the PTU operating in the slave mode does not interfere with the signal transmitted from the PTU.

The synchronizing may include synchronizing the operation of transmitting the signal from the PTU operating in the slave node to the PRU with the operation of transmitting the signal from the PTU to the PRU so that the PRU only receives one signal at a time.

The synchronizing may include transmitting a control signal to the PTU operating in the slave mode to control either one or both of a communication time or a communication frequency of the PTU operating in the slave mode.

Other features and aspects will be apparent from the following detailed description, the drawings, and the claims.

BRIEF DESCRIPTION OF THE DRAWINGS

FIG. 4A illustrates an example of a distribution of a magnetic field inside a resonator produced by feeding a feeder.

FIG. 8 illustrates an example of frequency hopping.

DETAILED DESCRIPTION

Figure 1:
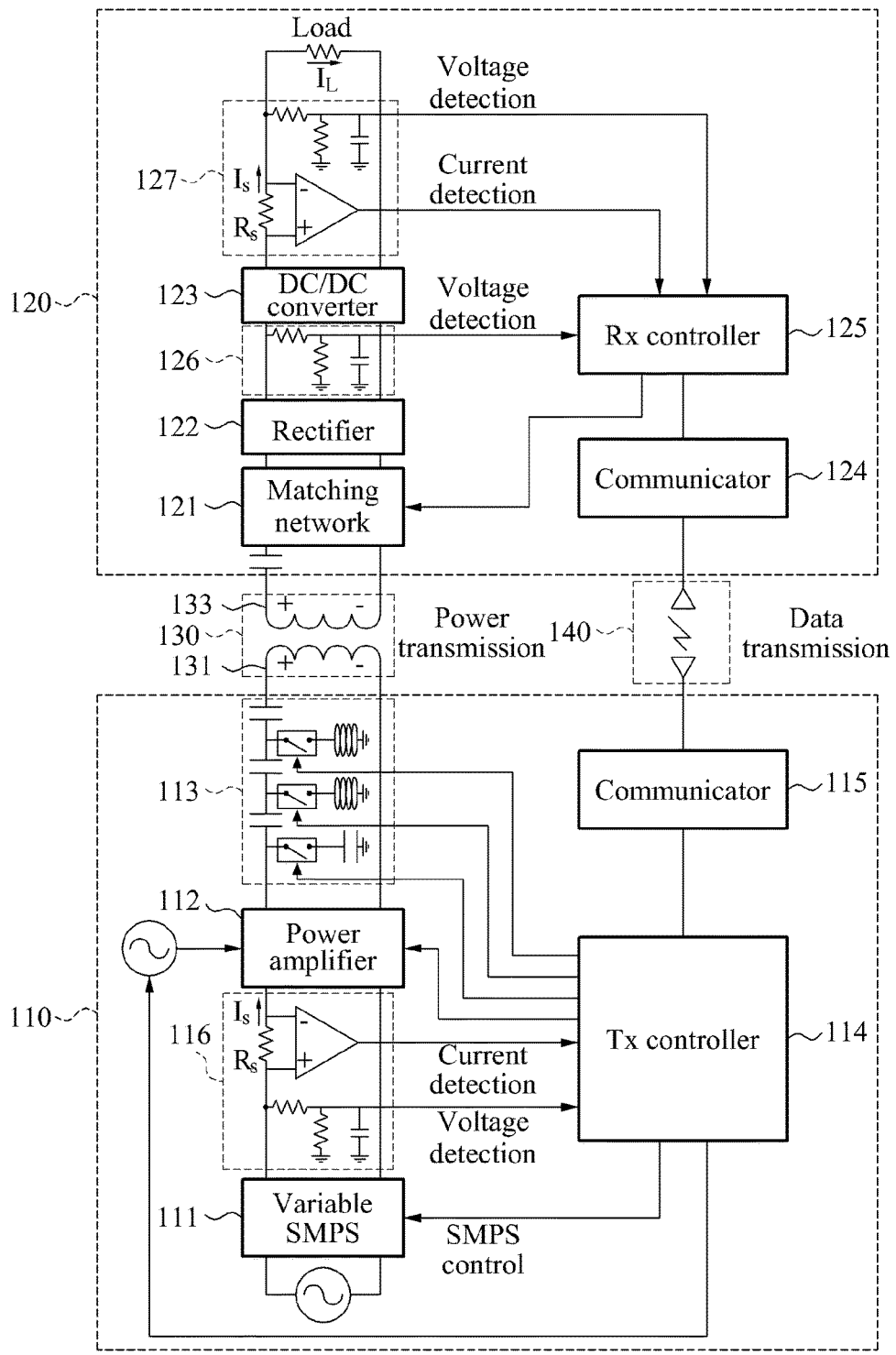
FIG. 1 illustrates an example of a wireless power transmission system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and not limited to those set forth herein, but may be changed as will be apparent to one of ordinary skill in the art, with the exception of operations necessarily occurring in a certain order. Also, description of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Communication schemes between a source and a target, or between a source and another source, may include an in-band communication scheme and an out-of-band communication scheme.

In the in-band communication scheme, the source and the target, or the source and the other source, communicate with each other using a frequency that is the same as a frequency used for power transmission.

In the out-of-band communication scheme, the source and the target, or the source and the other source, communicate with each other using a frequency that is different from a frequency used for power transmission.

FIG. 1 illustrates an example of a wireless power transmission system.

Referring to FIG. 1, the wireless power transmission system includes a source 110 and a target 120. The source 110 is a device configured to supply wireless power, and may include any electronic device capable of supplying power, for example, a pad, a terminal, a tablet personal computer (PC), a television (TV), a medical device, or an electric vehicle. The target 120 is a device configured to receive wireless power, and may include any electronic device requiring power to operate, for example, a pad, a terminal, a tablet PC, a medical device, an electric vehicle, a washing machine, a radio, or a lighting system.

The source 110 includes a variable switching mode power supply (SMPS) 111, a power amplifier (PA) 112, a matching network 113, a transmission (Tx) controller 114 (for example, Tx control logic), a communicator 115, and a power detector 116.

The variable SMPS 111 generates a direct current (DC) voltage by switching an alternating current (AC) voltage having a frequency of tens of hertz (Hz) output from a power supply. The variable SMPS 111 may output a fixed DC voltage, or may output an adjustable DC voltage that may be adjusted under control of the Tx controller 114.

The variable SMPS 111 may control its output voltage supplied to the PA 112 based on a level of power output from the PA 112 so that the PA 112 may operate in a saturation region with a high efficiency at all times, thereby enabling a maximum efficiency to be maintained at all levels of the output power of the PA 112. The PA 112 may be, for example, a Class-E amplifier.

If a fixed SMPS is used instead of the variable SMPS 111, a variable DC-to-DC (DC/DC) converter may be necessary. In this example, the fixed SMPS outputs a fixed DC voltage to the variable DC/DC converter, and the variable DC/DC converter controls its output voltage supplied to the PA 112 based on the level of the power output from the PA 112 so that the PA 112, which may be a Class-E amplifier, may operate in the saturation region with a high efficiency at all times, thereby enabling the maximum efficiency to be maintained at all levels of the output power of the PA 112.

The power detector 116 detects an output current and an output voltage of the variable SMPS 111, and transmits, to the Tx controller 114, information on the detected output current and the detected output voltage. Also, the power detector 116 may detect an input current and an input voltage of the PA 112.

The PA 112 generates power by converting a DC voltage having a predetermined level supplied to the PA 112 by the variable SMPS 111 to an AC voltage using a switching pulse signal having a frequency in a band of a few megahertz (MHz) to tens of MHz. For example, the PA 112 may convert the DC voltage supplied to the PA 112 to an AC voltage having a reference resonant frequency $F_{Ref}$, and may generate communication power used for communication, and/or charging power used for charging. The communication power and the charging power may be used in a plurality of targets.

If a high power from a few kilowatts (kW) to tens of kW is transmitted using a resonant frequency in a band of tens of kilohertz (kHz) to hundreds of kHz, the PA 112 may be omitted, and power may be supplied to a source resonator 131 from the variable SMPS 111 or a high-power power supply. For example, an inverter may be used in lieu of the PA 112. The inverter may convert a DC power supplied from the high-power power supply to an AC power. The inverter may convert the power by converting a DC voltage having a predetermined level to an AC voltage using a switching pulse signal having a frequency in a band of tens of kHz to hundreds of kHz. For example, the inverter may convert the DC voltage having the predetermined level to an AC voltage having a resonant frequency of the source resonator 131 in a band of tens of kHz to hundreds of kHz.

As used herein, the term "communication power" refers to a low power of 0.1 milliwatt (mW) to 1 mW. The term "charging power" refers to a high power of a few mW to tens of kW consumed by a load of a target. As used herein, the term "charging" refers to supplying power to a unit or element configured to charge a battery or other rechargeable device. Additionally, the term "charging" refers to supplying power to a unit or element configured to consume power. For example, the term "charging power" may refer to power consumed by a target while operating, or power used to charge a battery of the target. The unit or element may be, for example, a battery, a display device, a sound output circuit, a main processor, or any of various types of sensors.

As used herein, the term "reference resonant frequency" refers to a resonant frequency nominally used by the source 110, and the term "tracking frequency" refers to a resonant frequency used by the source 110 that has been adjusted based on a preset scheme.

The Tx controller 114 may detect a reflected wave of the communication power or the charging power, and may detect mismatching that occurs between a target resonator 133 and the source resonator 131 based on the detected reflected wave. To detect the mismatching, for example, the Tx controller 114 may detect an envelope of the reflected wave, a power amount of the reflected wave, or any other characteristic of the reflected wave that is affected by mismatching.

The matching network 113 compensates for impedance mismatching between the source resonator 131 and the target resonator 133 to achieve optimal matching under the control of the Tx controller 114. The matching network 113 includes at least one inductor and at least one capacitor each connected to a respective switch controlled by the Tx controller 114.

If a high power is to be transmitted using a resonant frequency in a band of tens of kHz to hundreds of kHz, the matching network 113 may be omitted from the source 110 because the effect of the matching network 113 may be reduced when transmitting the high power.

The Tx controller 114 may calculate a voltage standing wave ratio (VSWR) based on a level of an output voltage of the source resonator 131 or the PA 112 and a voltage level of the reflected wave. In one example, if the VSWR is greater than a predetermined value, the Tx controller 114 may determine that a mismatch is detected between the source resonator 131 and the target resonator 133.

In another example, if the Tx controller 114 detects that the VSWR is greater than the predetermined value, the Tx controller 114 may calculate a wireless power transmission efficiency for each of N tracking frequencies, determine a tracking frequency $F_{Best}$ providing the best wireless power transmission efficiency among the N tracking frequencies, and adjust the reference resonant frequency $F_{Ref}$ to the tracking frequency $F_{Best}$. The N tracking frequencies may be set in advance.

The Tx controller 114 may adjust a frequency of the switching pulse signal used by the PA 112. The frequency of the switching pulse signal may be determined under the control of the Tx controller 114. For example, by controlling the PA 112, the Tx controller 114 may generate a modulated signal to be transmitted to the target 120. In other words, the TX controller 114 may transmit a variety of data to the target 120 using in-band communication. The Tx controller 114 may also detect a reflected wave, and may demodulate a signal received from the target 120 from an envelope of the detected reflected wave.

The Tx controller 114 may generate a modulated signal for in-band communication using various methods. For example, the Tx controller 114 may generate the modulated signal by turning the switching pulse signal used by the PA 112 on and off, by performing delta-sigma modulation, or by any other modulation method known to one of ordinary skill in the art. Additionally, the Tx controller 114 may generate a pulse-width modulated (PWM) signal having a predetermined envelope.

The Tx controller 114 may determine an initial wireless power to be transmitted to the target 120 based on a change in a temperature of the source 110, a battery state of the target 120, a change in an amount of power received by the target 120, and/or a change in a temperature of the target 120.

The source 110 may further include a temperature measurement sensor (not illustrated) configured to detect a change in a temperature of the source 110. The source 110 may receive from the target 120 information regarding the battery state of the target 120, the change in the amount of power received by the target 120, and/or the change in the temperature of the target 120 by communicating with the target 120. The source 110 may detect the change in the temperature of the target 120 based on the information received from the target 120.

The Tx controller 114 may adjust a voltage supplied to the PA 112 based on the change in the temperature of the target 120 using a lookup table (LUT). The LUT may store a level of the voltage to be supplied to the PA 112 based on the change in the temperature of the source 110. For example, when the temperature of the source 110 rises, the Tx controller 114 may reduce the voltage to be supplied to the PA 112 by controlling the variable SMPS 111.

The communicator 115 may perform out-of-band communication using a separate communication channel. The communicator 115 may include a communication module, such as a ZigBee module, a Bluetooth module, or any other communication module known to one of ordinary skill in the art, that the communicator 115 may use to transmit or receive data 140 to or from the target 120 using the out-of-band communication.

The source resonator 131 transmits electromagnetic energy 130 to the target resonator 133. For example, the source resonator 131 may transmit the communication power or the charging power to the target 120 via magnetic coupling with the target resonator 133.

The source resonator 131 may be made of a superconducting material. Also, although not shown in FIG. 1, the source resonator 131 may be disposed in a container of coolant to enable the source resonator 131 to maintain a superconducting state. A heated coolant that has transitioned to a gaseous state may be liquefied to a liquid state by a cooler. The target resonator 133 may also be made of a superconducting material. In this instance, the target resonator 133 may also be disposed in a container of coolant to enable the target resonator 133 to maintain a superconducting state.

As illustrated in FIG. 1, the target 120 includes a matching network 121, a rectifier 122, a DC/DC converter 123, a communicator 124, a reception (Rx) controller 125 (for example, Rx control logic), a voltage detector 126, and a power detector 127.

The target resonator 133 receives the electromagnetic energy 130 from the source resonator 131. For example, the target resonator 133 may receive the communication power or the charging power from the source 110 via a magnetic coupling with the source resonator 131. Additionally, the target resonator 133 may receive data from the source 110 using the in-band communication.

The target resonator 133 may receive the initial wireless power determined by the Tx controller 114 based on the change in the temperature of the source 110, the battery state of the target 120, the change in the amount of power received by the target 120, and/or the change in the temperature of the target 120.

The matching network 121 matches an input impedance viewed from the source 110 to an output impedance viewed from a load of the target 120. The matching network 121 may be configured to have at least one capacitor and at least one inductor.

The rectifier 122 generates a DC voltage by rectifying an AC voltage received by the target resonator 133.

The DC/DC converter 123 adjusts a level of the DC voltage output from the rectifier 122 based on a voltage required by the load. As an example, the DC/DC converter 123 may adjust the level of the DC voltage output from the rectifier 122 to a level in a range of 3 volts (V) to 10 V.

The voltage detector 126 detects a voltage of an input terminal of the DC/DC converter 123, and the power detector 127 detects a current and a voltage of an output terminal of the DC/DC converter 123. The detected voltage of the input terminal may be used to calculate a wireless power transmission efficiency of the power received from the source 110. The detected current and the detected voltage of the output terminal may be used by the Rx controller 125 to calculate an amount of power actually transferred to the load. The Tx controller 114 of the source 110 may calculate an amount of power that needs to be transmitted by the source 110 to the target 120 based on an amount of power required by the load and the amount of power actually transferred to the load.

If the amount of the power actually transferred to the load calculated by the Rx controller 125 is transmitted to the source 110 by the communicator 124, the Tx controller 114 may calculate the amount of power that needs to be transmitted to the target 120, and may control either one or both of the variable SMPS 111 and the PA 112 to generate an amount of power that will enable the calculated amount of power to be transmitted by the source 110.

The Rx controller 125 may perform in-band communication to transmit and receive data to and from the source 110 using a resonant frequency. During the in-band communication, the Rx controller 125 may demodulate a received signal by detecting a signal between the target resonator 133 and the rectifier 122, or detecting an output signal of the rectifier 122. In particular, the Rx controller 125 may demodulate a message received using the in-band communication.

Additionally, the Rx controller 125 may adjust an input impedance of the target resonator 133 using the matching network 121 to modulate a signal to be transmitted to the source 110. For example, the Rx controller 125 may adjust the matching network 121 to increase the impedance of the target resonator 133 so that a reflected wave will be detected by the TX controller 114 of the source 110. Depending on whether the reflected wave is detected, the Tx controller 114 of the source 110 may detect a first value, for example, a binary number "0," or a second value, for example, a binary number "1." For example, when the reflected wave is detected, the Tx controller 114 may detect "0", and when the reflected wave is not detected, the Tx controller 114 may detect "1". Alternatively, when the reflected wave is detected, the Tx controller 114 may detect "1", and when the reflected wave is not detected, the Tx controller 114 may detect "0".

The communicator 124 of the target 120 may transmit a response message to the communicator 115 of the source 110. For example, the response message may include any one or any combination of a product type of the target 120, manufacturer information of the target 120, a model name of the target 120, a battery type of the target 120, a charging scheme of the target 120, an impedance value of a load of the target 120, information on characteristics of the target resonator 133 of the target 120, information on a frequency band used by the target 120, an amount of power consumed by the target 120, an identifier (ID) of the target 120, product version information of the target 120, standard information of the target 120, and any other information about the target 120.

The communicator 124 may perform out-of-band communication using a separate communication channel. For example, the communicator 124 may include a communication module, such as a ZigBee module, a Bluetooth module, or any other communication module known to one of ordinary skill in the art, that the communicator 124 may use to transmit and receive the data 140 to and from the source 110 using the out-of-band communication.

The communicator 124 may receive a wake-up request message from the source 110, and the power detector 127 may detect an amount of power received by the target resonator 133. The communicator 124 may transmit to the source 110 information on the detected amount of the power received by the target resonator 133. The information on the detected amount of the power received by the target resonator 133 may include, for example, an input voltage value and an input current value of the rectifier 122, an output voltage value and an output current value of the rectifier 122, an output voltage value and an output current value of the DC/DC converter 123, and any other information about the detected amount of the power received by the target resonator 133.

In the following description of FIGS. 2A through 4B, unless otherwise indicated, the term "resonator" may refer to both a source resonator and a target resonator. The resonator in FIGS. 2A through 4B may be used as the resonators described with respect to FIGS. 1 and 5-10.

Figure 2A:
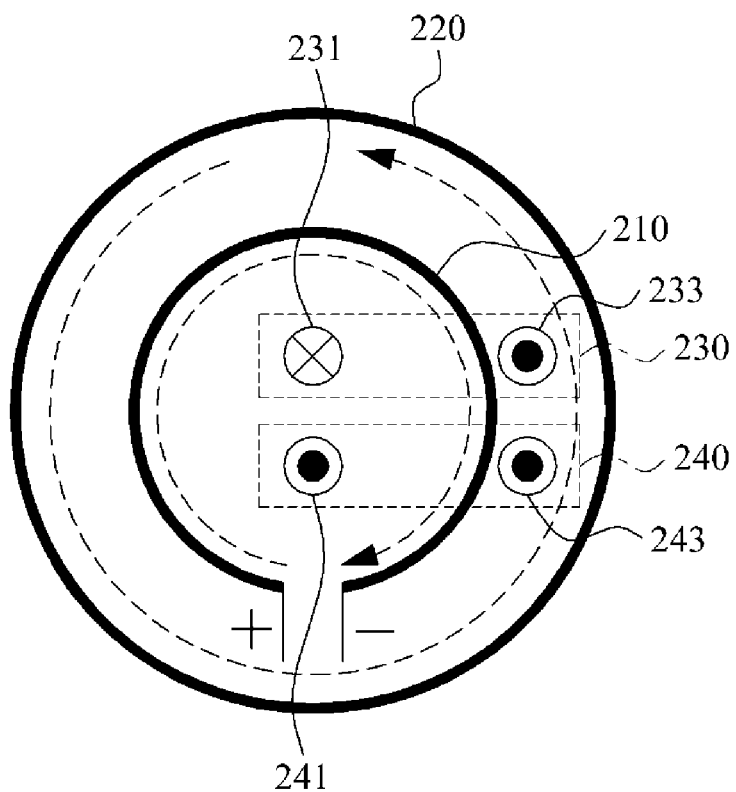
FIGS. 2A and 2B illustrate examples of a distribution of a magnetic field in a resonator and a feeder.
Figure 2B:
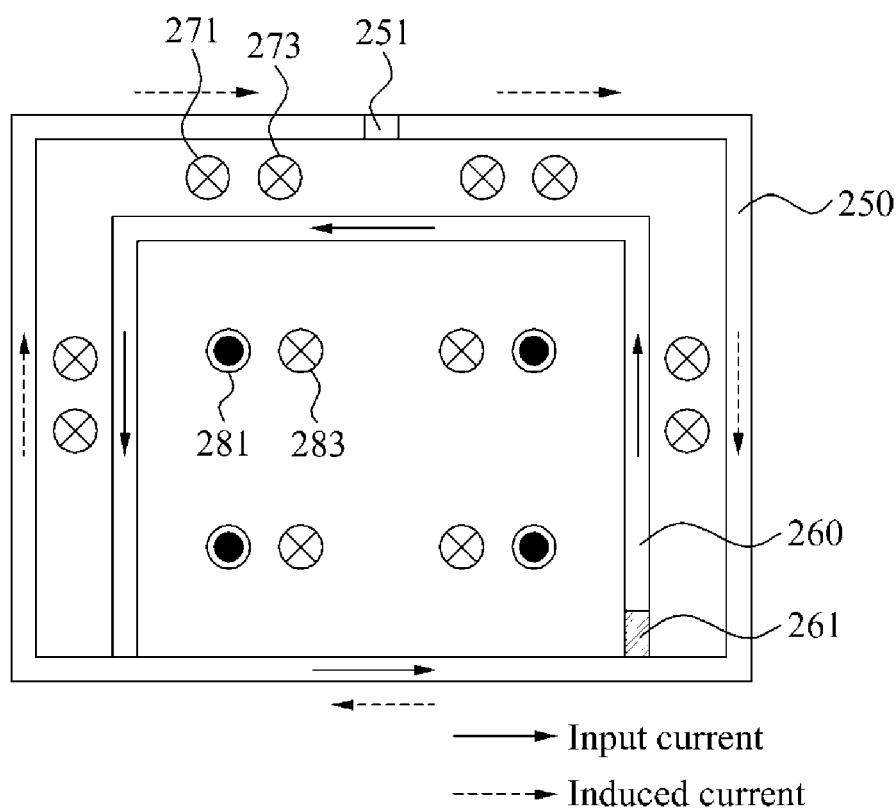

FIGS. 2A and 2B illustrate examples of a distribution of a magnetic field in a resonator and a feeder. When power is supplied to a resonator through a separate feeder, a magnetic field is generated in both the feeder and the resonator. A source resonator and a target resonator may each have a double loop structure including an external loop and an internal loop.

FIG. 2A is a diagram illustrating an example of a structure of a wireless power transmitter in which a feeder 210 and a resonator 220 do not have a common ground. Referring to FIG. 2A, when an input current flows into the feeder 210 through a terminal labeled "+" and out of the feeder 210 through a terminal labeled "−", a magnetic field 230 is generated by the input current. A direction 231 of the magnetic field 230 inside the feeder 210 is into the plane of FIG. 2A, and is opposite to a direction 233 of the magnetic field 230 outside the feeder 210, which is out of the plane of FIG. 2A. The magnetic field 230 generated in the feeder 210 induces a current to flow in the resonator 220. A direction of the induced current in the resonator 220 is opposite to a direction of the input current in the feeder 210 as indicated by the dashed lines with arrowheads in FIG. 2A.

The induced current in the resonator 220 generates a magnetic field 240. Directions of the magnetic field 240 generated by the resonator 220 are the same at all positions inside the resonator 220, and are out of the plane of FIG. 2A. Accordingly, a direction 241 of the magnetic field 240 generated by the resonator 220 inside the feeder 210 is the same as a direction 243 of the magnetic field 240 generated by the resonator 220 outside the feeder 210.

Consequently, when the magnetic field 240 generated by the feeder 210 and the magnetic field 240 generated by the resonator 220 are combined, a strength of the total magnetic field 240 decreases inside the feeder 210, but increases outside the feeder 210. Accordingly, when power is supplied to the resonator 220 via the feeder 210 configured as illustrated in FIG. 2, the strength of the total magnetic field decreases in the portion of the resonator 220 inside the feeder 210, but increases in the portion of the resonator 220 outside the feeder 210. When a distribution of a magnetic field is random or not uniform in the resonator 220, it may be difficult to perform impedance matching because an input impedance may frequently vary. Additionally, when the strength of the total magnetic field increases, a wireless power transmission efficiency increases. Conversely, when the strength of the total magnetic field decreases, the wireless power transmission efficiency decreases. Accordingly, the wireless power transmission efficiency may be reduced on average.

FIG. 2B illustrates an example of a structure of a wireless power transmitter in which a resonator 250 and a feeder 260 have a common ground. The resonator 250 includes a capacitor 251. The feeder 260 receives a radio frequency (RF) signal via a port 261. When the RF signal is input to the feeder 260, an input current is generated in the feeder 260. The input current flowing in the feeder 260 generates a magnetic field, and a current is induced in the resonator 250 by the magnetic field. Also, another magnetic field is generated by the induced current flowing in the resonator 250. In this example, a direction of the input current flowing in the feeder 260 is opposite to a direction of the induced current flowing in the resonator 250. Accordingly, in a region between the resonator 250 and the feeder 260, a direction 271 of the magnetic field generated by the input current is the same as a direction 273 of the magnetic field generated by the induced current, and thus the strength of the total magnetic field increases. Conversely, inside the feeder 260, a direction 281 of the magnetic field generated by the input current is opposite to a direction 283 generated by the induced current, and thus the strength of the total magnetic field decreases. Therefore, the strength of the total magnetic field decreases in a portion of the resonator 250 inside the feeder 260, but increases in a portion of the resonator 250 outside the feeder 260.

An input impedance may be adjusted by adjusting an internal area of the feeder 260. The input impedance is an impedance viewed in a direction from the feeder 260 to the resonator 250. When the internal area of the feeder 260 increases, the input impedance increases, and when the internal area of the feeder 260 decreases, the input impedance decreases. However, if the magnetic field is randomly or not uniformly distributed in the resonator 250, the input impedance value may vary based on a location of a target even if the internal area of the feeder 260 has been adjusted to adjust the input impedance to match an output impedance of a power amplifier for a specific location of the target device. Accordingly, a separate matching network may be needed to match the input impedance to the output impedance of the power amplifier. For example, when the input impedance increases, a separate matching network may be needed to match the increased input impedance to a relatively low output impedance of the power amplifier.

Figure 3A:
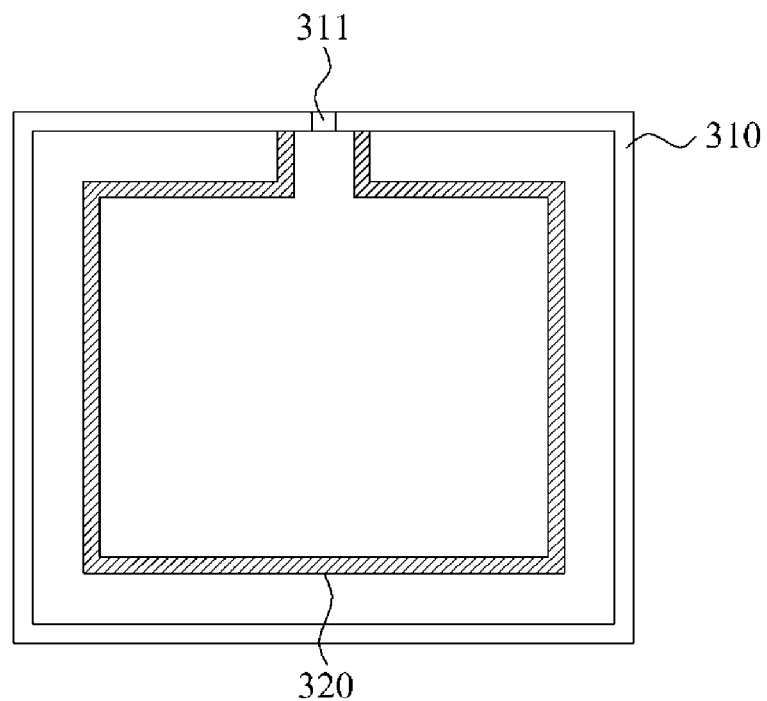
FIGS. 3A and 3B illustrate an example of a configuration of a resonator and a feeder.
Figure 3B:
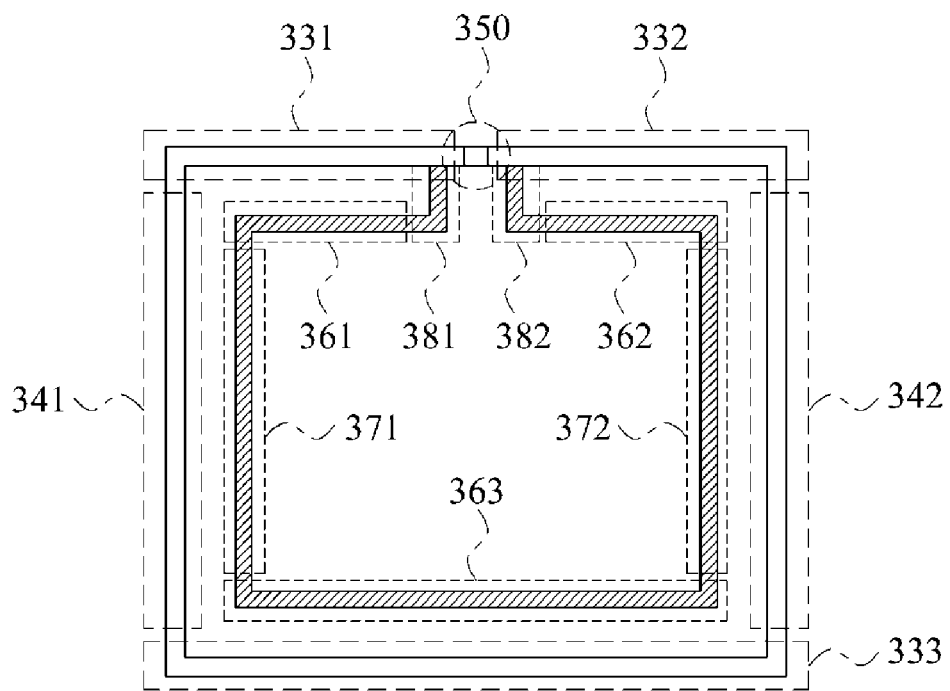

FIGS. 3A and 3B illustrate an example of a configuration of a resonator and a feeder.

Referring to FIG. 3A, a resonator 310 includes a capacitor 311. A feeder 320 is electrically connected to both ends of the capacitor 311.

FIG. 3B illustrates a structure of FIG. 3A in greater detail. The resonator 310 includes a first transmission line (not identified by a reference numeral in FIG. 3B, but formed by various elements in FIG. 3B as discussed below), a first conductor 341, a second conductor 342, and at least one capacitor 350.

The capacitor 350 is connected in series between a first signal conducting portion 331 and a second signal conducting portion 332 in the first transmission line, causing an electric field to be concentrated in the capacitor 350. In general, a transmission line includes at least one conductor disposed in an upper portion of the transmission line, and at least one conductor disposed in a lower portion of the transmission line. A current may flow through the at least one conductor disposed in the upper portion of the transmission line, and the at least one conductor in the lower portion of the transmission line may be electrically grounded. In the example in FIG. 3B, a conductor disposed in the upper portion of the first transmission line is separated into two portions that will be referred to as the first signal conducting portion 331 and the second signal conducting portion 332, and a conductor disposed in the lower portion of the first transmission line will be referred to as a first ground conducting portion 333.

As shown in FIG. 3B, the resonator has a generally two-dimensional (2D) structure. The first transmission line includes the first signal conducting portion 331 and the second signal conducting portion 332 in the upper portion of the first transmission line, and the first ground conducting portion 333 in the lower portion of the first transmission line. The first signal conducting portion 331 and the second signal conductor portion are disposed to face the first ground conducting portion 333. A current flows through the first signal conducting portion 333 and the second signal conducting portion 332.

Also, as shown in FIG. 3B, one end of the first signal conducting portion 331 is connected to one end of the first conductor 341, the other end of the first signal conducting portion 331 is connected to one end of the capacitor 350, and the other end of the first conductor 341 is connected to one end of the first ground conducting portion 333. One end of the second signal conducting portion 332 is connected to one end of the second conductor 342, the other end of the second signal conducting portion 332 is connected to the other end of the capacitor 350, and the other end of the second conductor 342 is connected to the other end of the first ground conducting portion 333. Accordingly, the first signal conducting portion 331, the second signal conducting portion 332, the first ground conducting portion 333, the first conductor 341, and the second conductor 342 are connected to one another, causing the resonator 310 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

The capacitor 350 is inserted into an intermediate portion of the first transmission line. In the example in FIG. 3B, the capacitor 350 is inserted into a space between the first signal conducting portion 331 and the second signal conducting portion 332. The capacitor 350 may be a lumped element capacitor, a distributed element capacitor, or any other type of capacitor known to one of ordinary skill in the art. For example, a distributed element capacitor may include zigzagged conductor lines and a dielectric having a high permittivity disposed between the zigzagged conductor lines.

The capacitor 350 inserted into the first transmission line may cause the resonator 310 to have a characteristic of a metamaterial. A metamaterial is a material having an electrical characteristic that is not found in nature, and thus may have an artificially designed structure. All materials existing in nature have a permittivity and a magnetic permeability. Most materials have a positive permittivity and a positive magnetic permeability.

In the case of most materials, a right-hand rule may be applied to an electric field, a magnetic field, and a Poynting vector, so the corresponding materials may be referred to as right-handed materials (RHMs). However, a metamaterial having a permittivity and/or a magnetic permeability not found in nature may be classified into an epsilon negative (ENG) material, a mu negative (MNG) material, a double negative (DNG) material, a negative refractive index (NRI) material, a left-handed (LH) material, and any other metamaterial classification known to one of ordinary skill in the art based on a sign of the permittivity of the metamaterial and a sign of the magnetic permeability of the metamaterial.

If the capacitor 350 is a lumped element capacitor and a capacitance of the capacitor 350 is appropriately determined, the resonator 310 may have a characteristic of a metamaterial. If the resonator 310 is caused to have a negative magnetic permeability by appropriately adjusting the capacitance of the capacitor 350, the resonator 310 may also be referred to as an MNG resonator. Various criteria may be applied to determine the capacitance of the capacitor 350. For example, the various criteria may include a criterion for enabling the resonator 310 to have the characteristic of the metamaterial, a criterion for enabling the resonator 310 to have a negative magnetic permeability at a target frequency, a criterion for enabling the resonator 310 to have a zeroth-order resonance characteristic at the target frequency, and any other suitable criterion. Based on any one or any combination of the aforementioned criteria, the capacitance of the capacitor 350 may be appropriately determined.

The resonator 310, hereinafter referred to as the MNG resonator 310, may have a zeroth-order resonance characteristic of having a resonant frequency when a propagation constant is "0". When the MNG resonator 310 has the zeroth-order resonance characteristic, the resonant frequency is independent of a physical size of the MNG resonator 310. The resonant frequency of the MNG resonator 310 having the zeroth-order resonance characteristic may be changed without changing the physical size of the MNG resonator 310 by changing the capacitance of the capacitor 350.

In a near field, the electric field is concentrated in the capacitor 350 inserted into the first transmission line, causing the magnetic field to become dominant in the near field. The MNG resonator has a relatively high Q-factor when the capacitor 350 is a lumped element capacitor, thereby increasing a wireless power transmission efficiency. The Q-factor indicates a level of an ohmic loss or a ratio of a reactance with respect to a resistance in the wireless power transmission. As will be understood by one of ordinary skill in the art, the wireless power transmission efficiency will increase as the Q-factor increases.

Although not illustrated in FIG. 3B, a magnetic core passing through the MNG resonator 310 may be provided to increase a wireless power transmission distance.

Referring to FIG. 3B, the feeder 320 includes a second transmission line (not identified by a reference numeral in FIG. 3B, but formed by various elements in FIG. 3B as discussed below), a third conductor 371, a fourth conductor 372, a fifth conductor 381, and a sixth conductor 382.

The second transmission line includes a third signal conducting portion 361 and a fourth signal conducting portion 362 in an upper portion of the second transmission line, and a second ground conducting portion 363 in a lower portion of the second transmission line. The third signal conducting portion 361 and the fourth signal conducting portion 362 are disposed to face the second ground conducting portion 363. A current flows through the third signal conducting portion 361 and the fourth signal conducting portion 362.

Additionally, as shown in FIG. 3B, one end of the third signal conducting portion 361 is connected to one end of the third conductor 371, the other end of the third signal conducting portion 361 is connected to one end of the fifth conductor 381, and the other end of the third conductor 371 is connected to one end of the second ground conducting portion 363. One end of the fourth signal conducting portion 362 is connected to one end of the fourth conductor 372, the other end of the fourth signal conducting portion 362 is connected to one end of the sixth conductor 382, and the other end of the fourth conductor 372 is connected to the other end of the second ground conducting portion 363. The other end of the fifth conductor 381 is connected to the first signal conducting portion 331 at or near where the first signal conducting portion 331 is connected to one end of the capacitor 350, and the other end of the sixth conductor 382 is connected to the second signal conducting portion 332 at or near where the second signal conducting portion 332 is connected to the other end of the capacitor 350. Thus, the fifth conductor 381 and the sixth conductor 382 are connected in parallel with both ends of the capacitor 350. The fifth conductor 381 and the sixth conductor 382 may be used as input ports to receive an RF signal as an input.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 are connected to one another, causing the resonator 310 and the feeder 320 to have an electrically closed loop structure. The term "loop structure" includes a polygonal structure, a circular structure, a rectangular structure, and any other geometrical structure that is closed, i.e., a geometrical structure that does not have any opening in its perimeter. The expression "having a loop structure" indicates a structure that is electrically closed.

If an RF signal is input to the fifth conductor 381 or the sixth conductor 382, an input current flows in the feeder 320 and the resonator 310, generating a magnetic field that induces a current in the resonator 310. A direction of the input current flowing in the feeder 320 is the same as a direction of the induced current flowing in the resonator 310, thereby causing a strength of the total magnetic field in the resonator 310 to increase inside the feeder 320, but decrease outside the feeder 320.

An input impedance is determined by an area of a region between the resonator 310 and the feeder 320. Accordingly, a separate matching network used to match the input impedance to an output impedance of a power amplifier may not be needed. However, even if a matching network is used, the input impedance may be adjusted by adjusting a size of the feeder 320, and accordingly a structure of the matching network may be simplified. The simplified structure of the matching network reduces a matching loss of the matching network.

The second transmission line, the third conductor 371, the fourth conductor 372, the fifth conductor 381, and the sixth conductor 382 of the feeder 320 may have the same structure as the resonator 310. For example, if the resonator 310 has a loop structure, the feeder 320 may also have a loop structure. As another example, if the resonator 1610 has a circular structure, the feeder 320 may also have a circular structure.

FIG. 4A illustrates an example of a distribution of a magnetic field inside a resonator produced by feeding a feeder. FIG. 4A more simply illustrates the resonator 310 and the feeder 320 of FIGS. 3A and 3B, and the names and the reference numerals of the various elements in FIG. 3B will be used in the following description of FIG. 4A for ease of description.

A feeding operation may be an operation of supplying power to a source resonator in wireless power transmission, or an operation of supplying AC power to a rectifier in the wireless power transmission. FIG. 4A illustrates a direction of an input current flowing in the feeder 320, and a direction of an induced current flowing in the resonator 310 operating as a source resonator. Additionally, FIG. 4A illustrates a direction of a magnetic field generated by the input current of the feeder 320, and a direction of a magnetic field generated by the induced current of the resonator 310.

Referring to FIG. 4A, the fifth conductor 381 or the sixth conductor 382 of the feeder 320 may be used as an input port 410. In FIG. 4A, the sixth conductor 382 is being used as the input port 410. The input port 410 receives an RF signal as an input. The RF signal may be output from a power amplifier. The power amplifier may increase or decrease an amplitude of the RF signal based on a power requirement of a target. The RF signal received by the input port 410 is represented in FIG. 4A as an input current flowing in the feeder 320. The input current flows in a clockwise direction in the feeder 320 along the second transmission line of the feeder 320. The fifth conductor 381 and the sixth conductor 382 of the feeder 320 are electrically connected to the resonator 310. More particularly, the fifth conductor 381 is connected to the first signal conducting portion 331 of the resonator 310, and the sixth conductor 382 of the feeder 320 is connected to the second signal conducting portion 332 of the resonator 310. Accordingly, the input current flows in both the resonator 310 and the feeder 320. The input current flows in a counterclockwise direction in the resonator 310. The input current flowing in the resonator 310 generates a magnetic field, and the magnetic field induces a current in the resonator 310. The induced current flows in a clockwise direction in the resonator 310. The induced current in the resonator 310 supplies energy to the capacitor 311 of the resonator 310, and also generates a magnetic field. In this example, the input current flowing in the feeder 320 and the resonator 310 is indicated by the solid lines with arrowheads in FIG. 4A, and the induced current flowing in the resonator 310 is indicated by the dashed lines with arrowheads in FIG. 4A.

A direction of a magnetic field generated by a current is determined based on the right-hand rule. As illustrated in FIG. 4A, inside the feeder 320, a direction 421 of the magnetic field generated by the input current flowing in the feeder 320 is the same as a direction 423 of the magnetic field generated by the induced current flowing in the resonator 310. Accordingly, the strength of the total magnetic field increases inside the feeder 320.

In contrast, as illustrated in FIG. 4A, in a region between the feeder 320 and the resonator 310, a direction 433 of the magnetic field generated by the input current flowing in the feeder 320 is opposite to a direction 431 of the magnetic field generated by the induced current flowing in the resonator 310. Accordingly, the strength of the total magnetic field decreases in the region between the feeder 320 and the resonator 310.

Generally, in a resonator having a loop structure, a strength of a magnetic field decreases in the center of the resonator, increases near an outer periphery of the resonator. However, referring to FIG. 4A, since the feeder 320 is electrically connected to both ends of the capacitor 311 of the resonator 310, the direction of the induced current in the resonator 310 is the same as the direction of the input current in the feeder 320. Since the direction of the induced current in the resonator 310 is the same as the direction of the input current in the feeder 320, the strength of the total magnetic field increases inside the feeder 320, and decreases outside the feeder 320. As a result, due to the feeder 320, the strength of the magnetic field increases in the center of the resonator 310 having the loop structure, and decreases near an outer periphery of the resonator 310, thereby compensating for the normal characteristic of the resonator 310 having the loop structure in which the strength of the magnetic field decreases in the center of the resonator 310, and increases near the outer periphery of the resonator 310. Thus, the strength of the total magnetic field may be constant inside the resonator 310.

A wireless power transmission efficiency of transmitting power from a source resonator to a target resonator is proportional to the strength of the total magnetic field generated in the source resonator. In other words, when the strength of the magnetic field increases in the center of the source resonator, the wireless power transmission efficiency also increases.

Figure 4B:
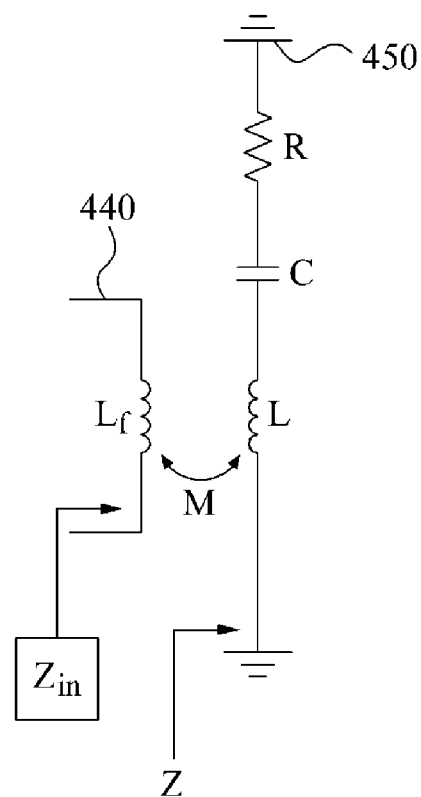
FIG. 4B illustrates an example of equivalent circuits of a feeder and a resonator.

FIG. 4B illustrates an example of equivalent circuits of a feeder and a resonator.

Referring to FIG. 4B, a feeder 440 and a resonator 450 may be represented by the equivalent circuits in FIG. 4B. The feeder 440 is represented as an inductor having an inductance $L_1$, and the resonator 450 is represented as a series connection of an inductor having an inductance L coupled to the inductance $L_1$ of the feeder 440 by a mutual inductance M, a capacitor having a capacitance C, and a resistor having a resistance R. An example of an input impedance $Z_{in}$ viewed in a direction from the feeder 440 to the resonator 450 may be expressed by the following Equation 1.

$$Z_{in} = \frac{(\omega M)^2}{Z} \quad (1)$$

In Equation 1, M denotes a mutual inductance between the feeder 440 and the resonator 450, ω denotes a resonant frequency between the feeder 440 and the resonator 450, and Z denotes an impedance viewed in a direction from the resonator 450 to a target. As can be seen from Equation 1, the input impedance $Z_{in}$ is proportional to the square of the mutual inductance M. Accordingly, the input impedance $Z_{in}$ may be adjusted by adjusting the mutual inductance M between the feeder 440 and the resonator 450. The mutual inductance M depends on an area of a region between the feeder 440 and the resonator 450. The area of the region between the feeder 440 and the resonator 450 may be adjusted by adjusting a size of the feeder 440, thereby adjusting the mutual inductance M and the input impedance $Z_{in}$. Since the input impedance $Z_{in}$ may be adjusted by adjusting the size of the feeder 440, it may be unnecessary to use a separate matching network to perform impedance matching with an output impedance of a power amplifier.

In the resonator 450 and the feeder 440 included in a wireless power receiver, a magnetic field may be distributed as illustrated in FIG. 4A. The resonator 450 may operate as a target resonator 450. For example, the target resonator 450 may receive wireless power from a source resonator through magnetic coupling with the source resonator. The received wireless power induces a current in the target resonator 450. The induced current in the target resonator 450 generates a magnetic field, which induces a current in the feeder 440. If the target resonator 450 is connected to the feeder 440 as illustrated in FIG. 4A, a direction of the induced current in the target resonator 450 will be the same as a direction of the induced current in the feeder 440. Accordingly, for the reasons discussed above in connection with FIG. 4A, the strength of the total magnetic field will increase inside the feeder 440, and will decrease in the region between the feeder 440 and the target resonator 450.

Hereinafter, a "source", a "wireless power transmitter", a "Tx", and a "power transmitting unit (PTU)" may be referred to as a "PTU" for ease of description and conciseness. Also, a "target", a "wireless power receiver", an "Rx", and a "power receiving unit (PRU)" may be referred to as a "PRU". Further, a PTU operating in a master mode may be referred to as a "master device", and a PTU operating in a slave mode may be referred to as a "slave device".

A master device may be network-connected to at least one slave device. The expression "network-connected" refers to configuring a network for transmitting and/or receiving data between devices. In a network, the master device may operate as a controller of the slave device, and the slave device may be controlled by the master device.

Figure 5:
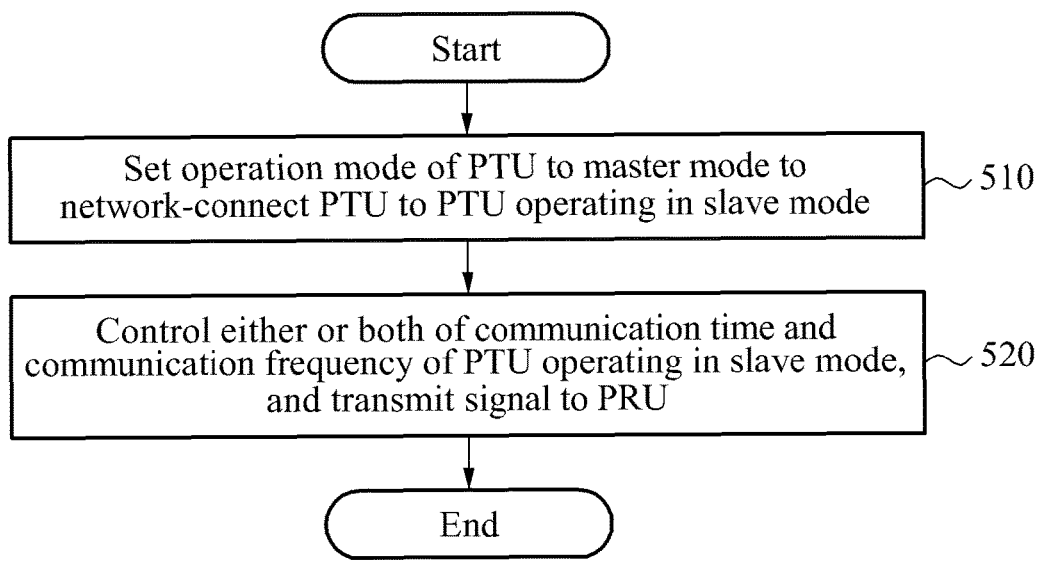
FIG. 5 illustrates an example of a method of synchronization control of a power transmitting unit (PTU).

FIG. 5 illustrates an example of a method of synchronization control of a PTU.

Referring to FIG. 5, in 510, the method of synchronization control of the PTU includes network-connecting a PTU to a PTU operating in a slave mode by setting an operation mode of the PTU to a master mode. There may be a plurality of PTUs operating in the slave mode. When power is supplied to the PTU, the PTU searches for a presence of a neighboring master device. The PTU may transmit or receive a search signal using out-of-band communication to search for the presence of the neighboring master device. The search signal may include an advertisement signal or an inquiry signal. When the master device is found to be present, the PTU sets its operation mode to the slave mode to be network-connected to the master device. When the neighboring master device is found to be absent, the PTU sets its operation mode to the master mode.

When the operation mode of the PTU is set to the master mode, the PTU periodically checks for a presence of a neighboring slave device. When the neighboring slave device is detected, the PTU transmits a connection request signal to the neighboring slave device. The connection request signal may include a connecting request signal or a paging signal. When a response signal responding to the connection request signal is received from the neighboring slave device, the PTU is network-connected to the neighboring slave device.

In 510, when a master device previously network-connected is turned off or removed, one of a plurality of slave devices sets its operation mode to a master mode to be network-connected to a neighboring slave device. In one example, the master device may set an index for the slave device. The index is an indication for numbering the slave device. The master device may transmit information on an index to a neighboring slave device. When there are a plurality of neighboring slave devices, the PTU may generate information on the index based on a sequential order in which the plurality of slave devices were network-connected to the PTU. The information on the index of the plurality of slave devices may be shared by the plurality of slave devices, and by a PRU network-connected to the plurality of slave devices. Subsequently, when the master device is turned off or removed, each slave device of the plurality of neighboring devices compares its index with the indices of the other ones of the plurality of neighboring slave devices. A slave device having a highest index sets its operation mode to the master mode, thereby becoming a master device, i.e., a PTU operating in the master mode. The PTU operating in the master mode is network-connected to a slave device, and operates as a controller of the slave device. In one example, when a first slave device is network-connected to the master device, and then a second slave device is network-connected to the master device, the master device may set information on an index of the first slave device to "1", and set information on an index of the second slave device to "2". When the master device is removed, the first slave device having the highest index "1" among a plurality of slave devices sets its operation mode to the master mode, and operates as a controller of the second slave device having the lower index "2" by being network-connected to the second slave device.

In 520, the method of synchronization control of the PTU includes controlling either one or both of a communication time and a communication frequency of the PTU operating in the slave mode, and transmitting a signal to a PRU. In this example, the PTU may transmit the signal to the PRU using the out-of-band communication. The signal to be transmitted to the PRU may include a beacon signal. The beacon signal may include a short beacon signal and a long beacon signal. The short beacon signal refers to a signal for detecting a presence of an object, for example, a PTU or a foreign material, within a predetermined range. The long beacon signal refers to a signal for waking up the PRU. Also, the signal to be transmitted to the PRU may include another besides the beacon signal, for example, a connection request signal, a control signal, and a data signal.

Method of Synchronization Control Using Communication Time

In 520, the master device may control a communication time of the slave device. The master device and the slave device may each transmit a signal to the PRU. When a plurality of PTUs simultaneously transmit a signal, for example, a beacon signal, to a single PRU, cross connection may occur. As used herein, cross connection is a communication connection error occurring due to a condition in which PTUs are concentrated in a small area. Accordingly, the master device may control a single PTU to transmit a signal to a single PRU during a single time slot. A time slot is a predetermined identifiable time interval, for example, a single time slot may be 625 μs.

In 520, the master device may obtain information on transmission signals of a plurality of slave devices. When a time slot during which transmission signals of the master device and the plurality of slave devices overlap exists, the master device may reset the information on the transmission signals of the plurality of slave devices so the transmission signals do not overlap.

In 520, the master device may control a transmission start time of a signal sequence to be transmitted to the PRU. When transmission periods of signal sequences to be transmitted by the master device and the plurality of slave devices to the PRU are the same as one another, and transmission start times of the master device and the plurality of slave devices are the same as one another, the signal sequences of the master device and the plurality of slave devices may be the same as one another, and thus the master device and the plurality of slave devices may transmit a signal during the same time slot. Conversely, when the transmission start times of the master device and the plurality of slave devices are different from one another, times slots during which the signal is transmitted to the PRU by the master device and the plurality of slave devices may be different from one another. In one example, the master device may control the transmission start times of the plurality of slave devices based on information on a preset signal. For example, when signal sequences of a master device and a first slave device are set prior to a signal sequence of a second slave device being set, the master device may control a transmission start time of the second slave device so that the signal sequence of the second slave device does not overlap the signal sequences of the master device and the first slave device. In another example, the master device may control a transmission start time of a slave device based on information on a signal to be transmitted by the master device. For example, the master device may set a signal sequence of the master device based on a priority of the master device, and control a transmission start time of the slave device so that a signal sequence of the slave device does not overlap the signal sequence of the master device.

In 520, the master device may control a transmission period of a signal sequence to be transmitted to the PRU. Transmission periods of the master device and the plurality of slave devices may be the same as one another, or may be different from one another. When the transmission periods of signal sequences of the master device and the plurality of slave devices are the same as one another, the master device may control transmission start times of the master device and the plurality of slave devices so that the transmission start times are different from one another so that the signal sequences do not overlap. Conversely, when the transmission periods of the signal sequences of the master device and the plurality of slave devices are different from one another, and the transmission start times of the master device and the plurality of slave devices are different from one another, the signal sequences may overlap. To prevent this, the master device may set the transmission start times of the master device and the plurality of slave devices, adjust the transmission periods of the signal sequences, and transmit a signal to control the signal sequences so they do not overlap. In one example, the master device may control transmission periods of the plurality of slave devices based on information on a preset signal. In another example, the master device may control the transmission periods of the plurality of slave devices based on information on the signal to be transmitted to the PRU by the master device. For example, the master device may set the signal sequence of the master device based on a priority of the master device, and adjust the transmission periods of the plurality of slave devices so the signal sequences of the master device and the plurality of slave devices do not overlap.

In 520, the master device may transmit a control signal to the plurality of slave devices to ensure that the PRU receives a single signal during a single time slot. The plurality of slave devices may transmit signals to the PRU based on the control signal of the master device because the master device is a controller of the plurality of slave devices. For example, when the PRU is found, the master device and the plurality of slave devices may transmit a beacon signal to the PRU. In this instance, the master device may transmit the beacon signal during a single time slot. Also, the master device may transmit a control signal to one of the plurality of slave devices during a single time slot, and the slave device that received the control signal may transmit the beacon signal to the PRU.

Method of Synchronization Control Using Communication Frequency

In 520, the master device may control a communication frequency of the slave device. The master device and the slave device may transmit a signal to a PRU. When a plurality of PTUs transmit a signal to a single PRU using the same frequency or the same channel, an interference signal may occur. Therefore, the master device may control a communication frequency of each of the master device and the slave device so that the master device and the slave device transmit the signal to the using different frequencies or different channels differing.

In 520, the master device may control the communication frequency using frequency hopping. Frequency hopping is a scheme for spreading a frequency spectrum by hopping a frequency of a transmission signal from one frequency to another frequency. The PTU may transmit the transmission signal by dividing the transmission signal into several frequencies. For example, the PTU may transmit a signal at a frequency of 2404 MHz during a first time slot, and transmit a signal at a frequency of 2434 MHz during a second time slot. In one example, when the PTU performs Bluetooth communication, the PTU may use 79 frequency hopping channels in steps of 1 MHz. When the PTU performs Bluetooth low energy (BLE) communication, the PTU may use 40 frequency hopping channels in steps of 2 MHz.

In 520, the master device may set frequency hopping sequences of the master device and the plurality of slave devices, control a communication frequency based on the frequency hopping sequences, and transmit a signal to the PRU. In one example, the master device may set a bandwidth of a frequency to be used, and array the frequency at predetermined intervals in the set bandwidth based on a pseudo-random scheme to set the frequency hopping sequences. In this instance, the master device may set the frequency hopping sequences so that a single PTU uses a single frequency during a predetermined time slot. For example, the master device may use a first channel, a first slave device may use a second channel, and a second slave device may use a third channel during a first time slot based on the frequency hopping sequences.

In one example, the master device may control a communication frequency of the slave device based on information on a preset signal. In particular, when the master device is set to use the first channel, and the first slave device is set to use the second channel, prior to a channel of the second slave device being set, the master device may control the second slave device to use the third channel. In another example, the master device may control a communication frequency of the plurality of slave devices based on information on a signal to be transmitted by the master device. For example, the master device may set a frequency hopping sequence of the master device based on a priority of the master device, and control a frequency hopping sequence of the plurality of slave devices so that the frequency hopping sequences of the master device and the plurality of slave devices do not overlap.

In 520, the master device may control a hopping start frequency of the frequency hopping sequence. In one example, the master device may use the same frequency hopping sequence as the plurality of slave devices. For example, PTUs may configure a piconet. As used herein, a piconet is a network in which at least one slave device is connected to a single master device. A plurality of piconets may have different frequency hopping sequences, and the master device and the plurality of slave devices belonging to the same piconet may be synchronized by the same frequency hopping sequence.

When the master device and the plurality of slave devices use the same frequency hopping sequence, and the frequency hopping starts at the same frequency, an interference signal may occur while continuously frequency hopping at the identical frequency. Conversely, when the frequency hopping starts at different frequencies, the occurrence of the interference signal may be minimized as frequencies may not overlap. For example, when a frequency hopping sequence of "1-2-3-4-5" is set, the master device may set a hopping start frequency of a first slave device to "2", and a hopping start frequency of a second slave device to "5". Accordingly, during five time slots, the first slave device may frequency hop in a sequential order of "2-3-4-5-1", and the second slave device may frequency hop in a sequential order of "5-1-2-3-4".

Figure 6A:
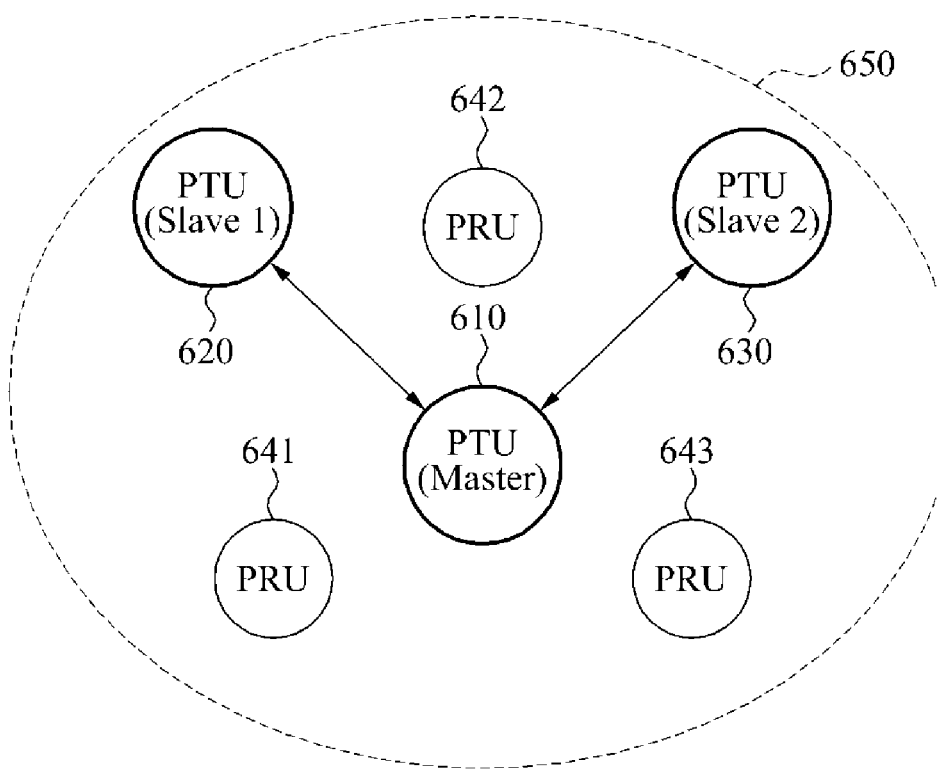
FIGS. 6A and 6B illustrate examples of a network of PTUs.
Figure 6B:
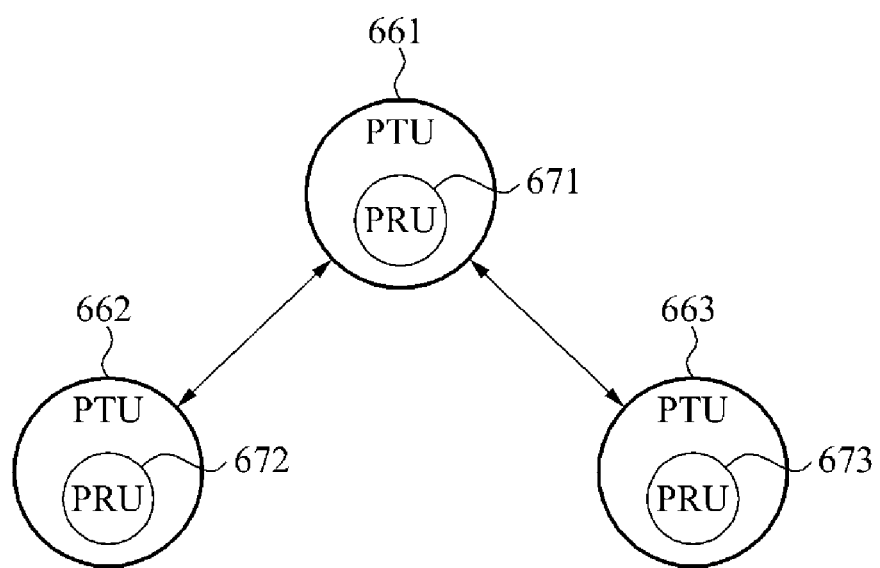

FIGS. 6A and 6B of a network of PTUs.

Referring to FIG. 6A, the network of the PTUs includes a master device 610, a first slave device 620, and a second slave device 630. In this example, an index of the first slave device 620 is higher than an index of the second slave device 630. PRUs 641 through 643 are present in a vicinity of the network of the PTUs. The PRUs 641 through 643 are disposed inside a region 650 in which power or a signal may be transmitted from the master device 610, the first slave device 620, and the second slave device 630. The master device 610, the first slave device 620, and the second slave device 630 may transmit a signal to the PRUs 641 through 643. In one example, to wake up the PRUs 641 through 643, the master device 610, the first slave device 620, and the second slave device 630 may transmit a beacon signal to the PRUs 641 through 643. In this instance, when the master device 610, the first slave device 620, and the second slave device 630 simultaneously transmit the beacon signal, cross connection may occur. In another example, the master device 610, the first slave device 620, and the second slave device 630 may transmit a data signal to the PRUs 641 through 643. In this instance, when the master device 610, the first slave device 620, and the second slave device 630 transmit the data signal using a single channel, an interference signal may occur.

In FIG. 6B, the network of the PTUs includes a master device 661, a first slave device 662, and a second slave device 663. PRUs 671 through 673 may be disposed on the master device 661, the first slave device 662, and the second slave device 663, respectively. In this instance, the PRUs 671 through 673 may receive power or a signal from the PTUs 661 through 663 on which the PRUs 671 through 673 are respectively disposed. Also, the PRUs 671 through 673 may receive power or a signal from one or more neighboring PTU, rather than from the master device 661, the first slave device 662, and the second slave device 663 on which the PRUs 671 through 673 are respectively disposed. Therefore, as in FIG. 6A, cross connection or an interference signal may occur.

To prevent the cross connection or the interference signal, the master devices 610 and 661 may transmit a signal to a PTU through controlling either one or both of a communication time and a communication frequency of the slave devices 620, 630, 662, and 663. Descriptions of the control of the master device over the communication time and the communication frequency of the plurality of slave devices will be provided in greater detail with reference to FIGS. 7A through 8.

FIGS. 7A through 7D illustrate examples of signal sequences of a master device and a plurality of slave devices.

Figure 7A:
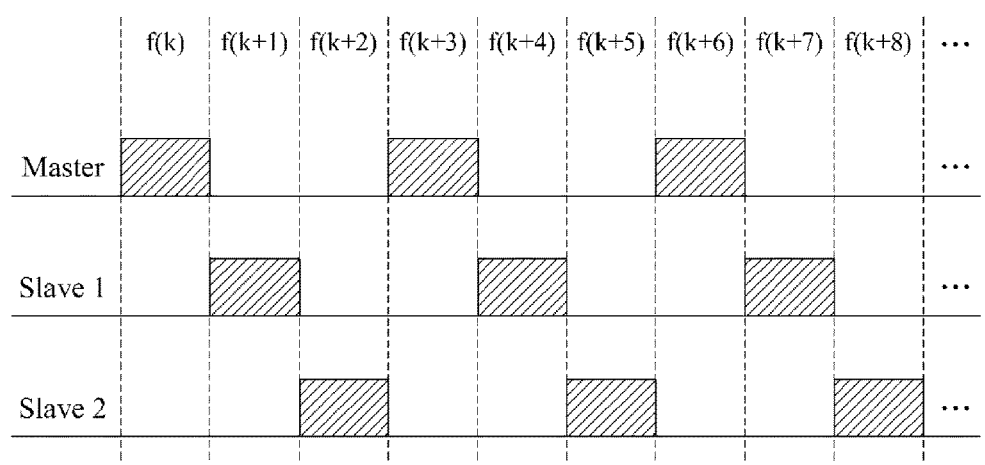
FIGS. 7A through 7D illustrate examples of signal sequences of a master device and plurality of slave devices.

FIG. 7A illustrates examples of signal sequences of a master device and a plurality of slave devices having the same transmission period.

Referring to FIG. 7A, f(k), f(k+1), and so on denote respective time slots. In particular, k denotes a number allotted to a time slot. In the example of FIG. 7A, transmission periods of the master device and the plurality of slave devices are each the same transmission period of 3 time slots. When transmission start times of the master device and the plurality of slave devices are the same as one another, the PRU may simultaneously receive a signal from 3 PTUs at intervals of 3 time slots. In this example, when a signal is a beacon signal, cross connection may occur. To prevent this, the master device may control the transmission start time of the master device and the plurality of slave devices so that 2 or more PTUs do not simultaneously transmit a signal.

For example, the master device may transmit a signal at intervals of 3 time slots during time slots of f(k), f(k+3), f(k+6), control a first slave device to transmit a signal at intervals of 3 time slots during time slots of f(k+1), f(k+4), and f(k+7), and control a second slave device to transmit a signal at intervals of 3 time slots during time slots of f(k+2), f(k+5), and f(k+8).

Figure 7B:
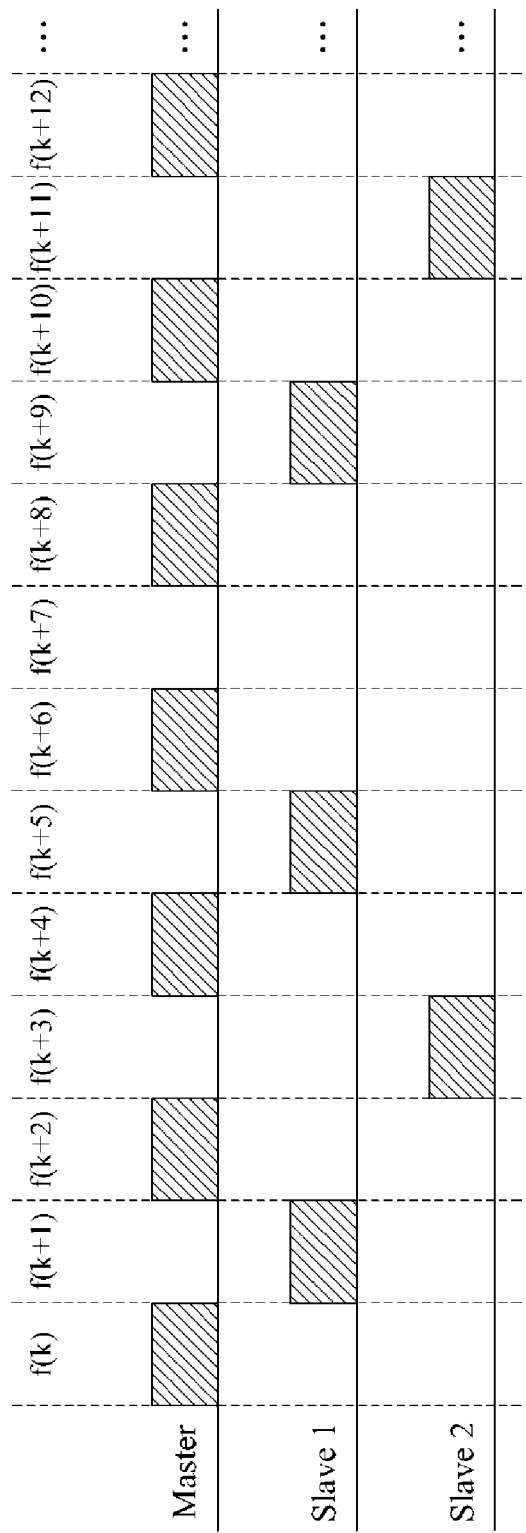

FIG. 7B illustrates examples of signal sequences of the master device and the plurality of slave devices when transmission periods of the master device and the plurality of slave devices are different from one another.

Referring to FIG. 7B, the master device may set the transmission periods of the master device and the plurality of slave devices to be different from one another, and transmit a signal to a PRU. In the example of FIG. 7B, the master device may set a transmission start time of the master device to f(k), set a transmission start time of the first slave device to f(k+1), and set a transmission start time of the second slave device to f(k+3). The master device may set the transmission periods of the master device and the plurality of slave devices so that the master device and the plurality of slave devices do not simultaneously transmit a signal. For example, the master device may set the transmission period of the master device to 2 time slots, set the transmission period of the first slave device to 4 time slots, and set the transmission period of the second slave device to 8 time slots. As a result, the master device may transmit a signal during time slots of f(k), f(k+2), f(k+4), f(k+6), f(k+8), f(k+10), and f(k+12), the first slave device may transmit the signal during time slots of f(k+1), f(k+5), and f(k+9), and the second slave device may transmit the signal during time slots of f(k+3) and f(k+11).

Figure 7C:
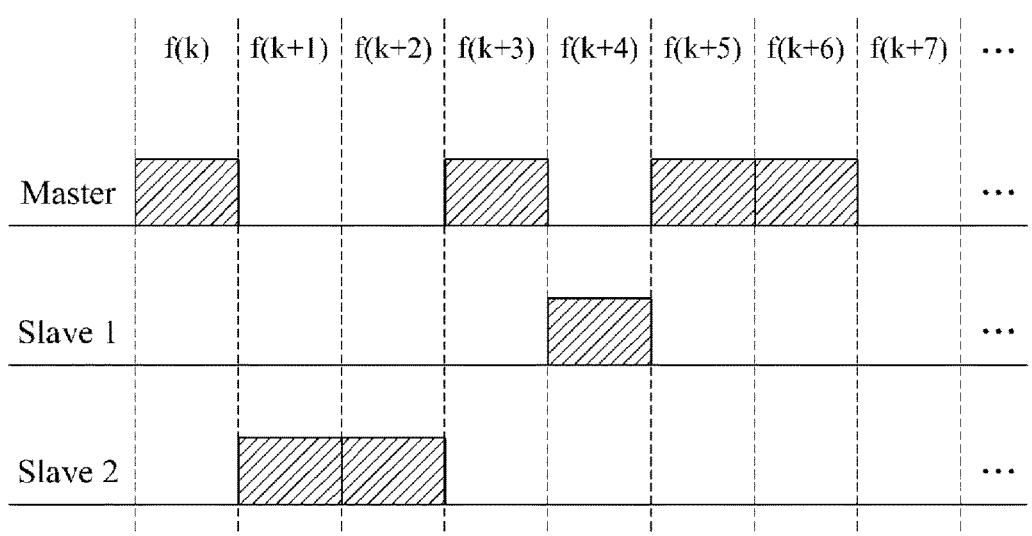

FIG. 7C illustrates examples of signal sequences of the master device and the plurality of slave devices when transmission periods of the master device and the plurality of slave devices vary.

Referring to FIG. 7C, the master device may transmit a control signal to the plurality of slave devices so that a PRU receives a single signal during a single time slot. The plurality of slave devices may transmit the signal based on the control signal of the master device because the master device is a controller of the plurality of slave devices. In the example of FIG. 7C, the master device may transmit a signal to a PRU during time slots of f(k), f(k+3), f(k+5), and f(k+6). The master device may transmit the control signal to the second slave device to control the second slave device to transmit a signal to the PRU during time slots of f(k+1) and f(k+2). The second slave device may transmit a signal to the PRU during the time slots of f(k+1) and f(k+2) in response to the control signal. Also, the master device may transmit the control signal to the first slave device to control the first slave device to transmit the signal to the PRU during a time slot f(k+4). The first slave device may transmit the signal to the PRU during the time slot f(k+4) in response to the control signal.

Figure 7D:
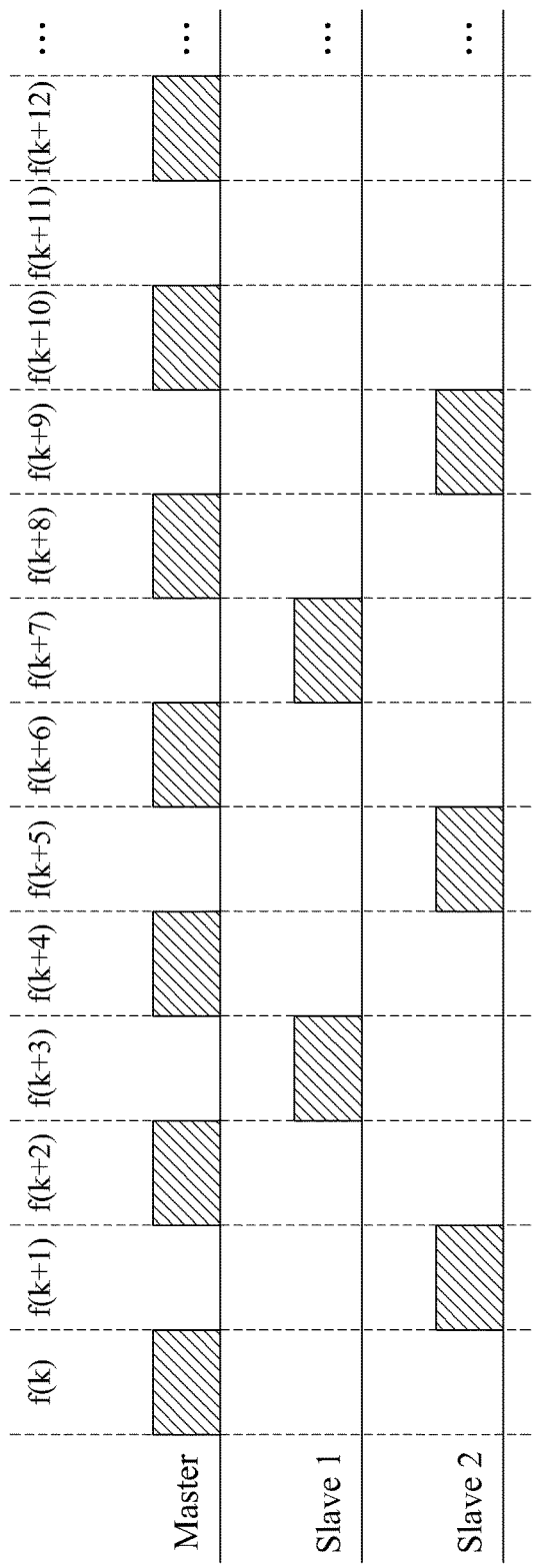

FIG. 7D illustrates examples of signal sequences of the master device and the plurality of slave devices when the signal sequences of the plurality of slave devices are set based on the signal sequence of the master device.

Referring to FIG. 7D, the master device may set a transmission start time of the signal sequence of the master device to be f(k), and set a transmission period to 2 time slots. Accordingly, the master device may transmit a signal during time slots of f(k), f(k+2), f(k+4), f(k+6), f(k+8), f(k+10), and f(k+12). The master device may set the signal sequences of a first slave device and a second slave device based on the signal sequence of the master device. The master device may control the transmission start time and the transmission period of the plurality of slave devices so that the master device and the plurality of slave devices do not simultaneously transmit the signal. For example, the master device may set the transmission start time of the first slave device to f(k+3), and set the transmission period to 4 time slots. Also, the master device may set the transmission start time of the second slave device to f(k+1), and set the transmission period of the second slave device to 4 time slots. Therefore, the first slave device may transmit the signal during time slots of f(k+3), f(k+7), and f(k+11), and the second slave device may transmit the signal during time slots of f(k+1), f(k+5), and f(k+9).

FIG. 8 illustrates an example of frequency hopping.

Referring to FIG. 8, a master device and a slave device may transmit a signal to a PRU using out-of-band communication. In one example, the out-of-band communication may be Bluetooth low energy (BLE) communication. In BLE communication, a communication frequency in a band of 2.4 GHz and 40 communication channels may be employed. In this instance, channels 0 through 36 may be channels for transmitting and/or receiving a data signal, and channels 37 through 39 may be channels for transmitting and/or receiving an advertisement signal.

In the example of FIG. 8, the master device may set frequency hopping sequences of the master device and the plurality of slave devices, and transmit a signal to a PRU by controlling a communication frequency based on the frequency hopping sequences. In one example, the master device may set a bandwidth of a frequency to be used, array frequencies at predetermined intervals in the set bandwidth based on a pseudo-random scheme, and set the frequency hopping sequence. For example, the master device may set the frequency hopping sequence of "channel 1 811-channel 6 812-channel 27 813-channel 9 814-channel 12 815".

The set frequency hopping sequence may be applied to the master device and the plurality of slave devices, and the master device may set a hopping start channel of the frequency hopping sequence. For example, the master device may set the hopping start channel of the master device to the channel 1 811, set the hopping start channel of the first slave device to the channel 27 813, and set the hopping start channel of the second slave device to the channel 12 815. Therefore, the master device may hop frequencies from a first time slot through a fifth time slot in a sequential order of "channel 1 811-channel 6 812-channel 27 813-channel 9 814-channel 12 815". The first slave device may hop frequencies in a sequential order of "channel 27 813-channel 9 814-channel 12 815-channel 1 811-channel 6 812". Additionally, the second slave device may hop frequencies in a sequential order of "channel 12 815-channel 1 811-channel 6 812-channel 27 813-channel 9 814".

Figure 9A:
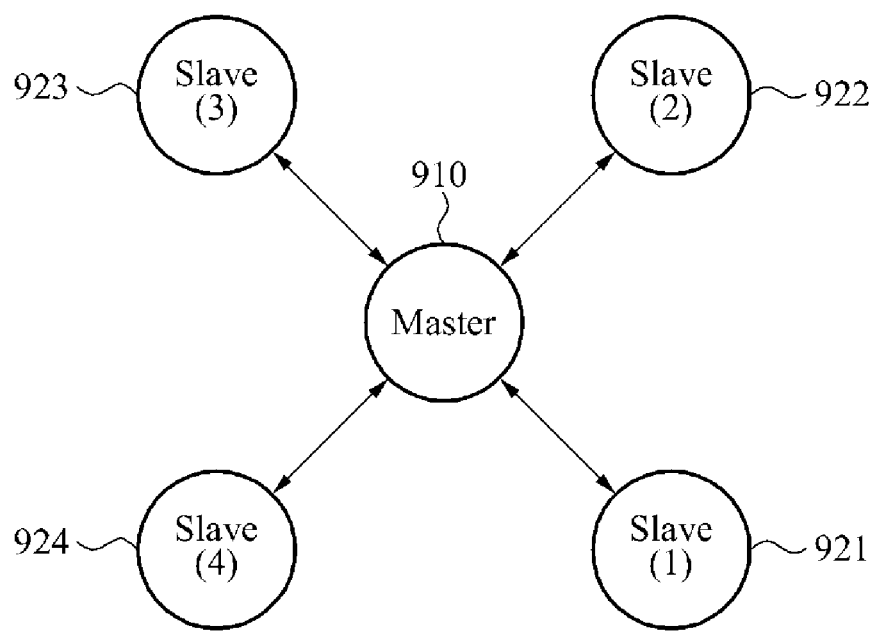
FIGS. 9A and 9B illustrate examples of a network-connection of a PTU.
Figure 9B:
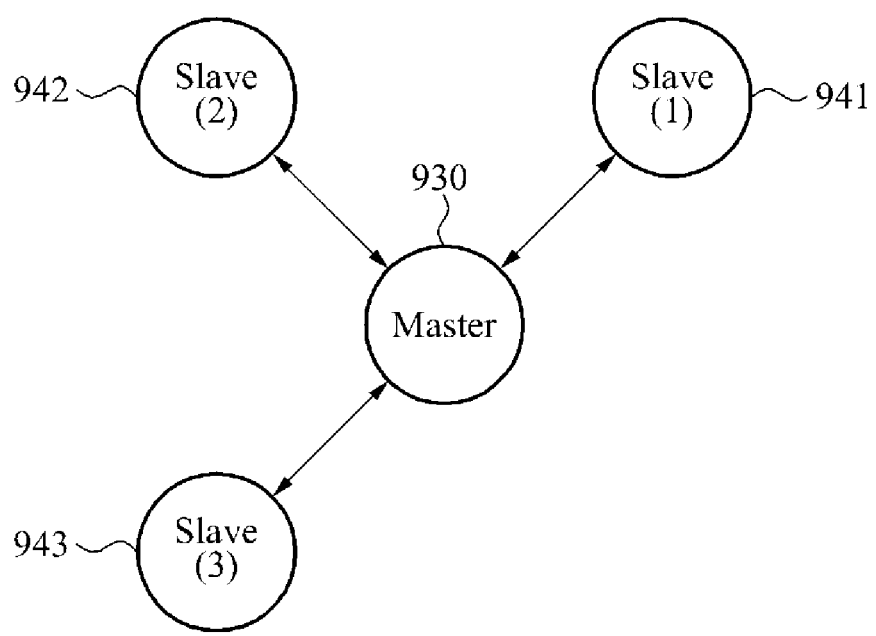

FIGS. 9A and 9B illustrate examples of a network-connection of a PTU.

Referring to FIG. 9A, a master device 910 is network-connected to a first slave device 921 through a fourth slave device 924. The first slave device 921 through the fourth slave device 924 may receive information on an index from the master device 910 to set respective indices of the first slave device 921 through the fourth slave device 924. For example, the indices may correspond to a sequential order in which the slave devices 921 through 924 were network-connected to the master device 910.

The master device 910 may be a controller of the first slave device 921 through the fourth slave device 924 to control a communication time and a communication frequency of the first slave device 921 through the fourth slave device 924. When the master device 924 is turned off or removed, the first slave device 921 through the fourth slave device 924 may compare their indices with one another. When the index of the first slave device 921 is highest, the first slave device 921 may set its operation mode to a master mode. Accordingly, the first slave device 921 may become a master device 930 to be network-connected to slave devices 941 through 943 as shown in FIG. 9B. The master device 930 may be a controller of the slave devices 941 through 943, and periodically monitor a presence of a neighboring slave device.

Figure 10:
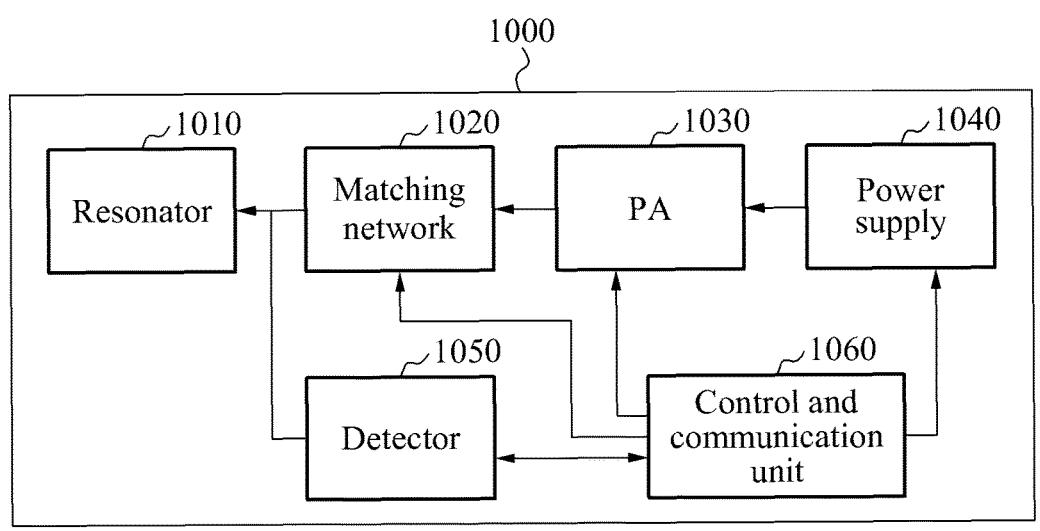
FIG. 10 illustrates an example of a configuration of a PTU.

FIG. 10 illustrates an example of a configuration of a PTU 1000.

Referring to FIG. 10, the PTU 1000 includes a resonator 1010, a matching network 1020, a PA 1030, a power supply 1040, a detector 1050, and a control and communication unit 1060.

The resonator 1010 generates magnetic field coupling with a resonator of a PTU or a PRU.

The matching network 1020 compensates for impedance mismatching between the resonator 1010 and the resonator of the PTU or the PRU under the control of the control and communication unit 1060 to achieve an optimal matching.

The PA 1030 generates power by converting a DC voltage having a predetermined level to an AC voltage under the control of the control and communication unit 1060.

The power supply 1040 supplies power to the PA 1030 under the control of the control and communication unit 1060.

The detector 1050 detects a current and a voltage flowing into the resonator 1010, and provides information on the detected current and the voltage to the control and communication unit 1060.

The control and communication unit 1060 may include a network connector (not shown) and a signal transmitter (not shown). The network connector (not shown) may set an operation mode of a PTU to a master mode to network-connect the PTU to a PTU operating in a slave mode, or to a neighboring PTU operating in the master mode. The signal transmitter (not shown) may control either one or both of a communication time and a communication frequency of the PTU operating in the slave mode to transmit a signal to a PRU.

Also, the control and communication unit 1060 may include an index comparer (not shown) and an operation mode setter (not shown). The index comparer (not shown) may compare indices of a PTU and a neighboring PTU operating in a slave mode when the neighboring PTU operating in the master mode is removed. The operation mode setter (not shown) may set the operation mode of the PTU to the master mode when the index of the PTU is higher than the index of the neighboring PTU operating in the slave mode.

Detailed descriptions with respect to the PTU of FIG. 10 will be omitted for conciseness since the descriptions provided with respect to FIGS. 1 through 9B are also applicable to the PTU of FIG. 10.

The Tx controller 114, the communicators 115 and 124, and the Rx controller 125 in FIG. 1, the control and communication unit 1060 in FIG. 10, and the network connector, the signal transmitter, the index comparer, and the operation mode setter described with respect to FIG. 10 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of synchronization control of a power transmitting unit (PTU), the method comprising:
   network-connecting a first PTU to a PTU operating in a slave mode by setting an operation mode of the first PTU to a master mode; and
   transmitting a signal from the PTU operating in the slave mode to a power receiving unit (PRU) by controlling, by the first PTU, either one or both of a communication time and a communication frequency of the PTU operating in the slave mode, such that the signal transmitted from the PTU operating in the slave mode and a signal transmitted from the first PTU do not overlap.

2. The method of claim 1, wherein the signal transmitted from the PTU operating in the slave mode to the PRU comprises a beacon signal.

3. The method of claim 1, wherein the transmitting of the signal to the PRU comprises controlling a transmission start time of a signal sequence to be transmitted to the PRU.

4. The method of claim 1, wherein the transmitting of the signal to the PRU comprises controlling a transmission period of a signal sequence to be transmitted to the PRU.

5. The method of claim 1, wherein the transmitting of the signal to the PRU comprises transmitting a control signal to the PTU operating in the slave mode to enable the PRU to receive a single signal during a single time slot.

6. The method of claim 1, wherein the transmitting of the signal to the PRU comprises controlling either one or both of the communication time and the communication frequency based on information on a preset signal.

7. The method of claim 1, wherein the transmitting of the signal to the PRU comprises controlling either one or both of the communication time and the communication frequency of the PTU operating in the slave mode based on information on the transmitted signal.

8. The method of claim 1, wherein the transmitting of the signal to the PRU comprises controlling the communication frequency using frequency hopping.

9. The method of claim 8, wherein the transmitting of the signal to the PRU further comprises:
   setting a frequency hopping sequence of the first PTU and the PTU operating in the slave mode; and
   transmitting the signal to the PRU by controlling the communication frequency based on the frequency hopping sequence.

10. The method of claim 9, wherein the transmitting of the signal to the PRU further comprises controlling a hopping start frequency of the frequency hopping sequence.

11. The method of claim 1, wherein the network-connecting of the first PTU to the PTU operating in the slave mode comprises setting an index of the PTU operating in the slave mode.

12. The method of claim 11, wherein the setting of the index of the PTU operating in the slave mode comprises transmitting information on the index to the PTU operating in the slave mode.

13. The method of claim 12, wherein the PTU operating in the slave mode is one of a plurality of PTUs operating in the slave mode; and
   the transmitting of the information on the index to the PTU operating in the slave mode comprises generating the information on the index based on a sequential order in which the plurality of PTUs operating in the slave mode were network-connected to the first PTU.

14. A non-transitory computer-readable storage medium storing a program for controlling a computer to perform the method of claim 1.

15. A method of synchronization control of a power transmitting unit (PTU), the method comprising:
   network-connecting a first PTU to a neighboring PTU operating in a master mode;
   setting an index of the first PTU and an index of the neighboring PTU operating in a slave mode based on a sequential order in which the first PTU and the neighboring PTU operating in the slave mode were network-connected to the neighboring PTU operating in the master mode;
   comparing the index of the first PTU to the index of the neighboring PTU operating in the slave mode in response to removal of the neighboring PTU operating in the master mode from the network-connection; and
   setting an operation mode of the first PTU to the master mode in response to a result of the comparing being that the index of the first PTU is higher than the index of the neighboring PTU operating in the slave mode.

16. The method of claim 15, wherein the setting of the operation mode of the PTU to the master mode comprises network-connecting the first PTU to the neighboring PTU operating in the slave mode by setting the operation mode of the first PTU to the master mode.

17. A method of synchronization control of a power transmitting unit (PTU), the method comprising:
   network-connecting a first PTU to a PTU operating in a slave mode by setting an operation mode of the first PTU to a master mode; and
   synchronizing an operation of transmitting a signal from the PTU operating in the slave mode to a power receiving unit (PRU) with an operation of transmitting a signal from the first PTU to the PRU.

18. The method of claim 17, wherein the synchronizing comprises synchronizing the operation of transmitting the signal from the PTU operating in the slave mode to the PRU with the operation of transmitting the signal from the first PTU to the PRU so that the signal transmitted from the PTU operating in the slave mode does not interfere with the signal transmitted from the first PTU.

19. The method of claim 17, wherein the synchronizing comprises synchronizing the operation of transmitting the signal from the PTU operating in the slave mode to the PRU with the operation of transmitting the signal from the first PTU to the PRU so that the PRU only receives one signal at a time.

20. The method of claim 17, wherein the synchronizing comprises transmitting a control signal to the PTU operating in the slave mode to control either one or both of a communication time or a communication frequency of the PTU operating in the slave mode.

21. The method of claim 1, wherein the transmitting comprises:
  controlling at least one of first signals for detecting a presence of the PRU and second signals for waking up the PRU so that the first signals and the second signals do not interfered with each other, the first signals and the second signals being transmitted from the first PTU and the PTU operating in the slave mode to the PRU.

* * * * *